United States Patent [19]

Clouston et al.

[11] Patent Number: 5,568,605
[45] Date of Patent: Oct. 22, 1996

[54] RESOLVING CONFLICTING TOPOLOGY INFORMATION

[75] Inventors: Robert D. Clouston, Cary; John S. Graham, Jr., Raleigh; John H. Zeiger, Cary, all of N.C.

[73] Assignee: International Business Machines Corporation, Armonk, N.Y.

[21] Appl. No.: 180,725

[22] Filed: Jan. 13, 1994

[51] Int. Cl.$^6$ ............................................. G06F 11/00
[52] U.S. Cl. ........................ 395/182.02; 364/DIG. 1; 364/242.95; 364/242.94; 395/200.06; 395/200.02; 395/200.15
[58] Field of Search ..................................... 395/200, 180

[56] References Cited

U.S. PATENT DOCUMENTS

| | | |
|---|---|---|
| 4,644,532 | 2/1987 | George et al. . |
| 4,718,005 | 1/1988 | Feigenbaum et al. . |
| 4,827,411 | 5/1989 | Arrowood et al. . |
| 5,049,873 | 9/1991 | Robins et al. ............... 340/825.06 |
| 5,084,870 | 1/1992 | Hutchison et al. .................. 370/94.1 |
| 5,101,348 | 3/1992 | Arrowood et al. .................. 395/200 |
| 5,109,483 | 4/1992 | Baratz et al. . |
| 5,204,955 | 4/1993 | Kagei et al. ........................ 395/575 |
| 5,218,676 | 6/1993 | Ben-Ayed et al. . |
| 5,226,120 | 7/1993 | Brown et al. ...................... 395/200 |
| 5,261,044 | 11/1993 | Dev et al. ........................ 395/154 |
| 5,317,742 | 5/1994 | Bapat ............................. 395/700 |
| 5,388,189 | 2/1995 | Kung ............................. 395/50 |
| 5,404,532 | 4/1995 | Allen et al. ....................... 395/700 |
| 5,414,812 | 5/1995 | Filip et al. ....................... 395/200 |

*Primary Examiner*—Alvin E. Oberley
*Assistant Examiner*—St. John Courtenay, III
*Attorney, Agent, or Firm*—Homer L. Knearl; Gerald R. Woods

[57] ABSTRACT

A topology manager external to a communications network manages the network and in particular resolves conflicting topology information about the network by dividing the management of the topology data base into two operations—a collection instance and a resolution layer. A collection instance collects all information that its agent node has about the topology of the network. This topology information is processed by the collection instance to determine for each resource in the network whether the resource is new, reachable or has experienced a reachability change. The resolution layer receives the topology resource information from each collection instance. When a resource is indicated as reachable by a collection instance, that resource is placed on a Reach list as an entry from that collection instance. If the collection instance indicates the resource from that collection instance is no longer reachable, the resolution layer will remove that resource entry from the Reach list, and look for another Best Reach entry for the resource. If the network fragments and nodes go down and come back up, the resolution layer can resolve conflicts in resource information from separate collection instances to select the most current information for a resource.

7 Claims, 8 Drawing Sheets

FIG. 2

| INPUT | STATES | | | |
|---|---|---|---|---|
| | 1<br>RESET | 2<br>INITMON | 3<br>RECVMON | 4<br>MON |
| MONCMD | 2(A1) | -(-) | -(-) | -(-) |
| STOPCMD | -(-) | 1(A2) | 1(A9,A2) | 1(A9,A2) |
| UPDATE | -(-) | 3(A3,A4) | -(A4) | -(A4,A7,A8) |
| ITC | -(-) | E(A2) | 4(A6,A8) | E(A9,A1) |
| FAILURE | -(-) | 1(-) | 1(A9) | 1(A9) |
| TERM | -(-) | 1(A2) | 1(A9,A2) | 1(A9,A2) |
| DEL | -(-) | E(A2) | E(A9,A2) | -(A5) |

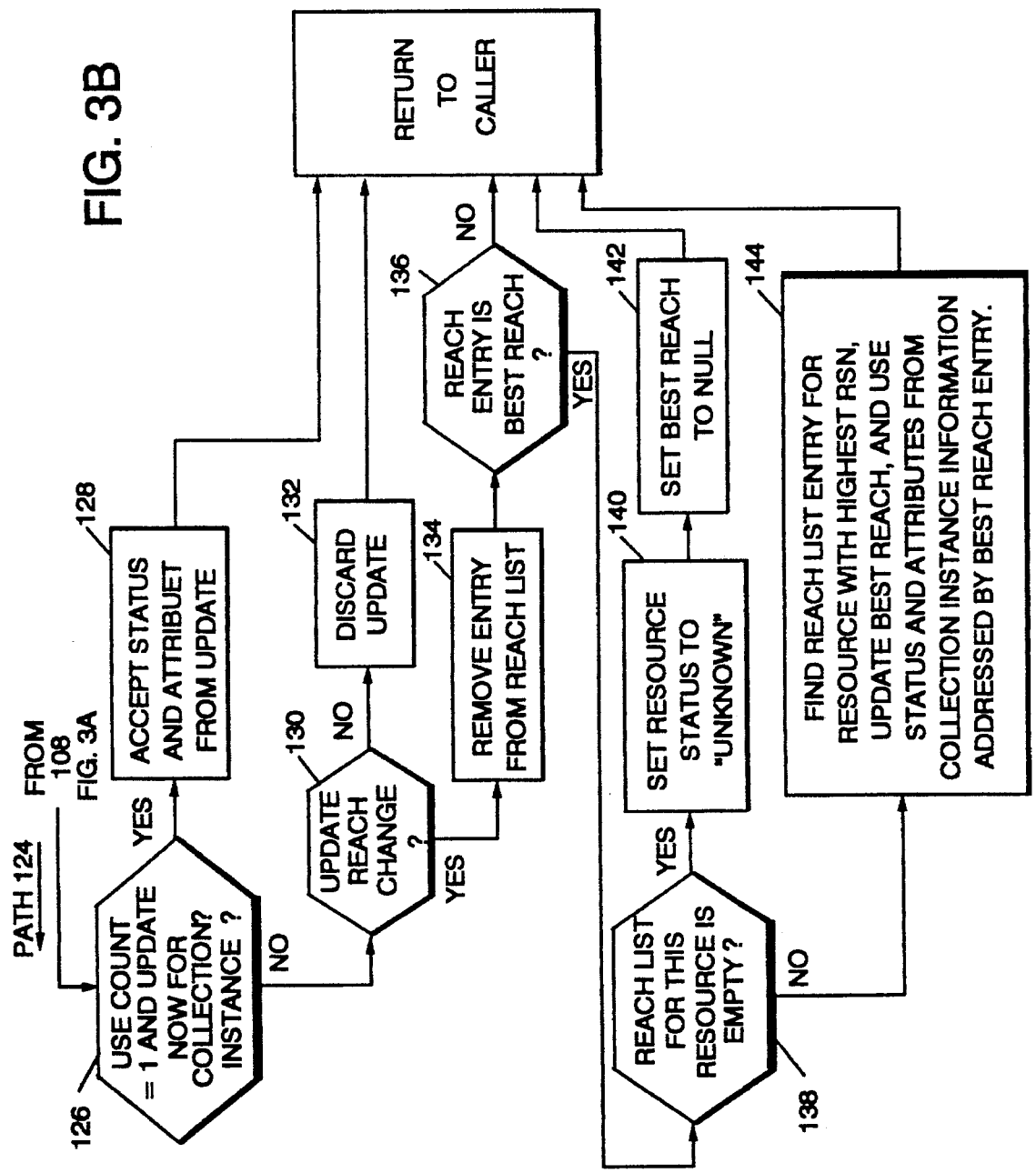

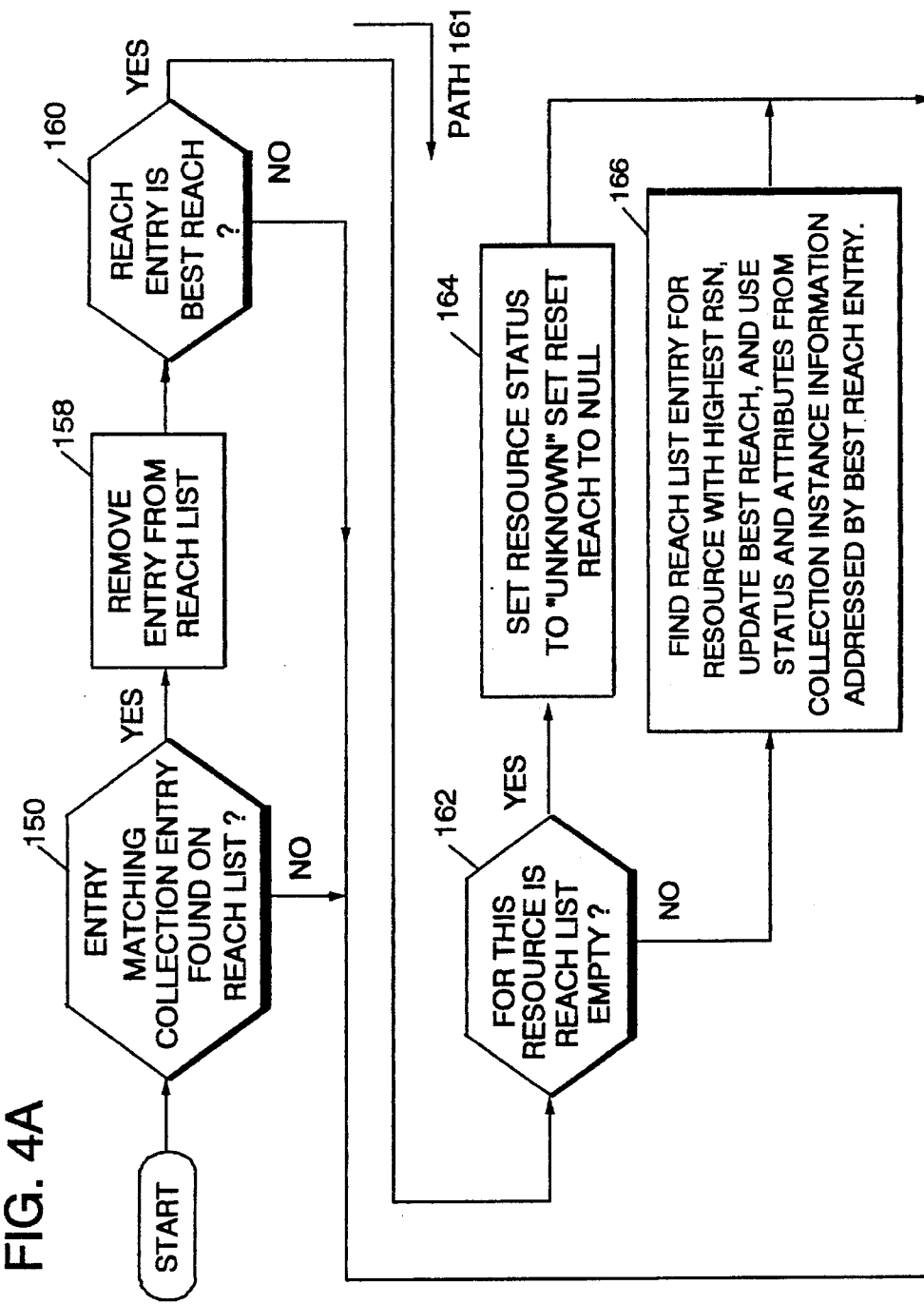

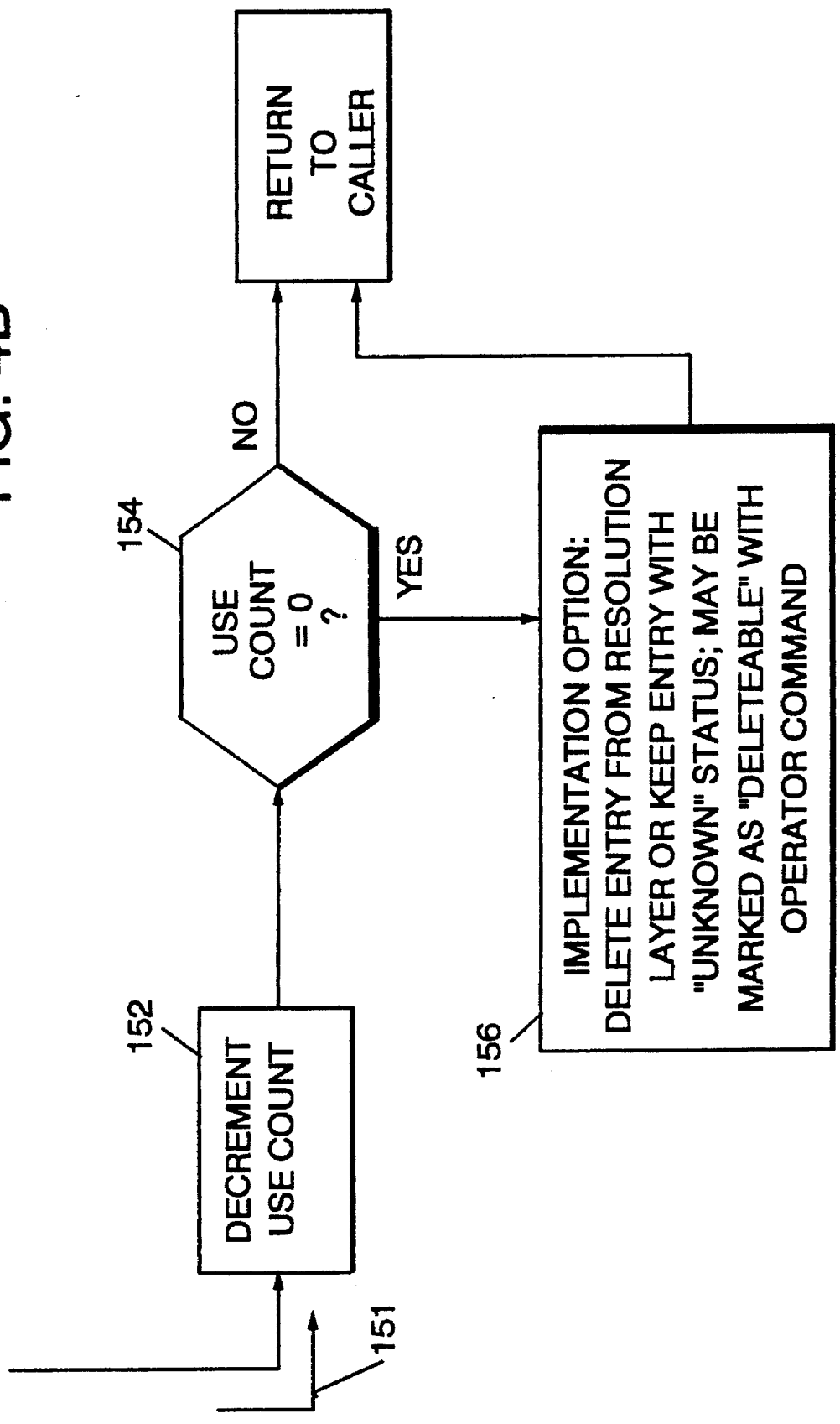

RESOLVING CONFLICTING TOPOLOGY INFORMATION

BACKGROUND OF THE INVENTION

1. Field of the Invention

This invention relates to resolving conflicting topology information in a communication network. More particularly, the invention relates to a topology manager that is separate from the network, has agents in the network, collects topology information from the agents and resolves conflicting topology information.

2. Description of Prior Art

In a data communication network, nodes participating in communication share network topology information. The accuracy of the topology information is guaranteed by using self-correcting sequence numbers to resolve conflicting topology information. However, this requires that the node participate in both receiving and sending network information to other nodes.

A problem arises when a computer application program, acting as a network topology manager, does not reside on a communication node that can send network topology information to correct topology information inconsistencies. Today, a topology manager application may not even be a part of the network. In such a situation, the topology manager is relying on an agent application program to forward topology information about the network. This is especially common where a vendor is providing management services to a network, but does not participate in normal data exchange on the network.

Inconsistent information arises in a network when a network becomes fragmented. Some nodes in the fragmented network can no longer exchange topology information with other nodes. Each node retains all of its topology information, even though some of the information may no longer be reliable. When the network reconnects, each node only needs to be informed of updates that happened while fragmented rather than relearning the entire topology of the network.

When a topology manager is not on a node that participates in sending topology information, or is not in the network at all, during fragmentation the manager may receive topology information from each subnetwork formed by the fragmentation. The problem for the manager is to determine what topology information from each subnetwork is reliable.

The following United States patents are exemplary of the topology management from within the network: U.S. Pat. No. 4,718,005 entitled "Distributed Control of Alias Name Usage in Networks;" U.S. Pat. No. 4,827,411 entitled "Method of Maintaining a Topology Database;" U.S. Pat. No. 4,644,532 entitled "Automatic Update of Topology in a Hybrid Network;" U.S. Pat. No. 5,049,873 entitled "Communication Network State and Topology Monitor;" U.S. Pat. No. 5,109,483 entitled "Node Initiating XID Exchanges Over an Activated Link Including an Exchange of Sets of Binding Signals Between Nodes for Establishing Sessions;" and U.S. Pat. No. 5,218,676 entitled "Dynamic Routing System for a Multinode Communications Network." Since the topology management is within the network in these patents, they do not have the problem described above and addressed by the present invention.

SUMMARY OF THE INVENTION

It is an object of this invention to manage a communications network with a manager external to the network, and to resolve conflicting topology information received from different nodes in the network.

In accordance with this invention, the above problem is solved by dividing the management of the topology data base into two operations—a collection instance and a resolution layer. Each collection instance is associated with a node in the network where the manager has an agent application. This collection instance collects all the information that its agent node has about the topology of the network. This topology information is processed by the collection instance to determine for each resource in the network whether the resource is new, reachable or has experienced a reachability change. A resource is a node or a transmission group between nodes. Reachability refers to whether there is connectivity in the network to the resource. Each collection instance passes this topology information for its agent to the resolution layer.

The resolution layer receives the topology resource information from each collection instance. If the network fragments, this resource information from each collection instance will have conflicts. When a resource is indicated as reachable by a collection instance, that resource is placed on a Reach list as an entry from that collection instance. If the resource information has the highest RSN (Resource Sequence Number), the entry is marked as the Best Reach for that resource. If the collection instance indicates the resource from that collection instance is no longer reachable, the resolution layer will remove that resource entry from the Reach list and look for another Best Reach entry for the resource. If the network fragments and nodes go down and come back up, the resolution layer can resolve conflicts in information from multiple collection instances to select the most current information for a resource.

Other advantages and features of the invention will be understood by those of ordinary skill in the art after referring to the complete written description of the preferred embodiments in conjunction with the following drawings.

BRIEF DESCRIPTION OF DRAWINGS

FIG. 2 shows the finite state machine preferred embodiment of each collection instance in FIG. 1.

FIGS. 3A and 3B show the preferred embodiment of logical operations in the resolution layer in FIG. 1 for processing update messages from a collection instance.

FIGS. 4A and 4B show the preferred embodiment of logical operations in the resolution layer in FIG. 1 for processing delete messages from a collection instance.

DETAILED DESCRIPTION

Figure 1:
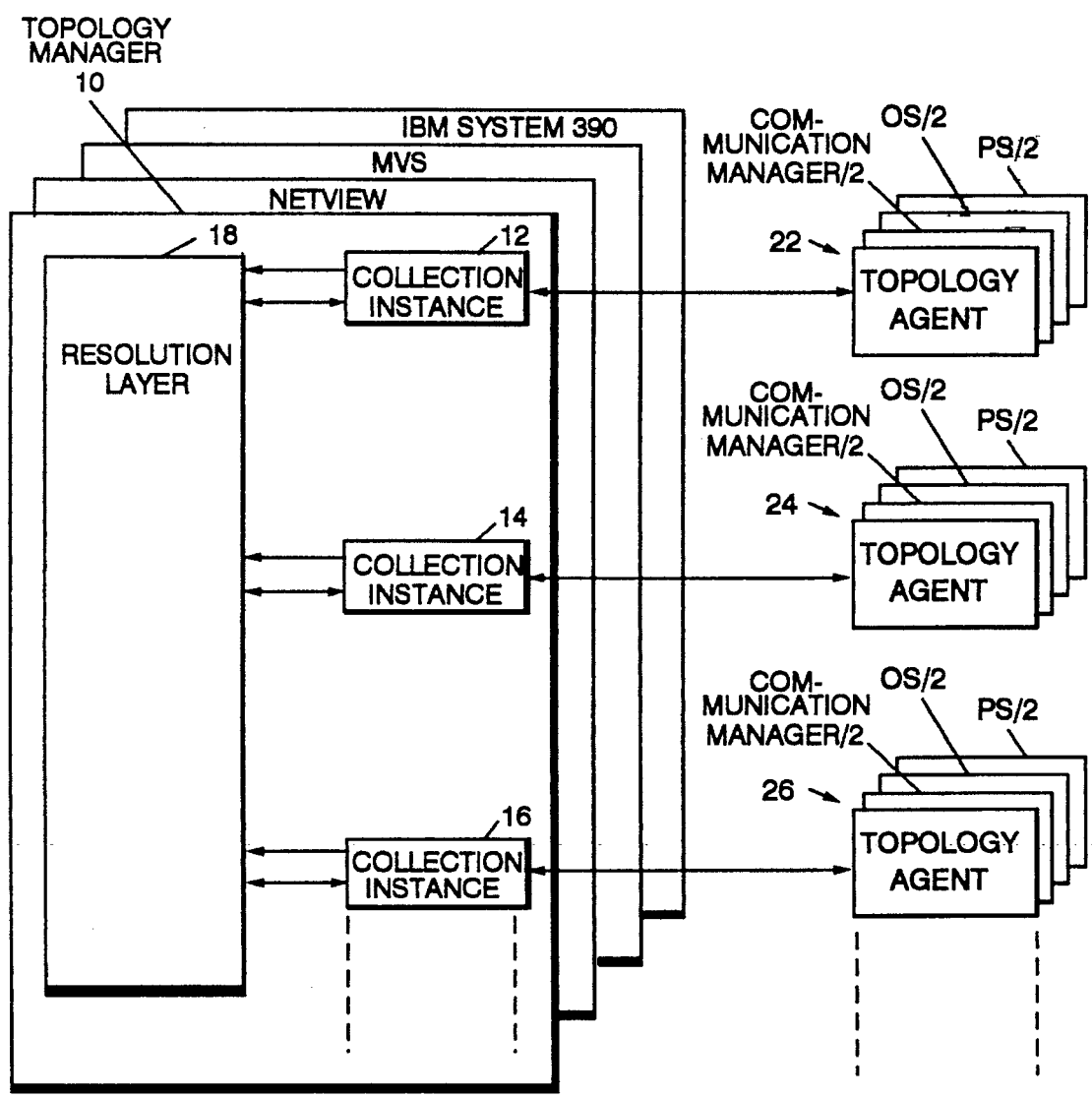
FIG. 1 illustrates the elements of the inventive topology manager and the data flow paths between the manager on a host computing system and its agents at workstations.

The topology manager 10 in the preferred embodiment of the invention, as shown in FIG. 1, is implemented as an application program running on a NETVIEW program that runs on MVS on an IBM System 390 computer. The topology manager, for the purpose of resolving conflicting topology information, is divided into collection instances 12, 14, 16 and a resolution layer 18. Each collection instance 12, 14 or 16 collects topology information from an agent application 22, 24 or 26, respectively, running on a node in the communication network. Each collection instance passes the topology information from its agent to the resolution layer 18. In addition, the resolution layer may request and receive information from each collection instance. The agent applications are on nodes that participate in sending topology information to other nodes in the network. The topology agent is a program application running on the Communication Manager/2 program that runs on OS/2 on an IBM PS/2 computer. In the topology manager, each collection instance is implemented as a finite state machine which is described hereinafter with reference to FIG. 2. The logical operations of the resolution layer 18 are illustrated and described hereinafter with reference to FIGS. 3A, 3B, 4A and 4B.

The finite state machine to implement each collection instance is shown in FIG. 2. The stable states of the machine are identified by the State column labels 1 through 4. The valid states are RESET, INITMON, RECVMON, and MON. These states are defined as follows:

States

RESET—Initial or terminal state; no data structures are allocated.

INITMON—A monitor request has been sent to the agent but no response has been received yet.

RECVMON—The agent has sent at least one update but has not sent an indication that it has sent its complete topology yet.

MON—The agent has indicated that it has sent a complete set of updates to represent its network topology database, and will send additional updates as changes occur.

The inputs to the collection instance state machine are listed in the left most column of FIG. 2. The inputs are defined as follows:

Inputs monCmd—Operator requests monitoring of network topology by agent node.

stopCmd—Operator terminates monitoring of agent node.

update—A resource (node or transmission group) update is received from the agent. Multiple resource updates may be packaged in a single flow from the agent to the manager, but hey are presented individually to the collection instance.

ITC—The agent has sent an InitialTransferComplete indication that it has sent its complete network topology database.

Failure—Some kind of failure has occurred that will prevent the manager from receiving updates from the agent. This may have been an agent application or agent node failure or lack of topology agent function, communications outage, protocol error, or an internal topology manager error.

term—The entire topology manager is shutting down, either due to operator request or internal error.

del—A resource deletion notification is received from the agent.

The Finite State Machine (FSM) operates by performing the actions indicated in each state column at the row specified by the input. For example, if the machine is in State 1, RESET, and the input command is MONCMD, the state machine executes the action represented by the action code, A1, in parentheses. After executing the action, the state machine goes to the state indicated by the number preceding the parentheses. Accordingly, for the example of receiving a MONCMD input while in the RESET state, the FSM executes action A1 and changes to state 2, INITMON. If there is more than one action code indicated for a given state when it receives the appropriate input, the actions are executed in the sequence listed in FIG. 2. Thus, if while in state 2, INITMON, the FSM receives the input, UPDATE, action A3 is executed followed by action A4. The actions performed for each action code are defined as follows:

Action Codes

A1—Request for network topology sent to agent code.

A2—Cancel of network topology request sent to agent node.

A3—Do any initialization of the database needed to handle node and transmission group updates about to be received.

A4—If the resource (node or TG) is not already in the collection instance's database, create an entry for the resource and copy the attributes into the entry. If the resource does exist, replace existing attributes with attributes from the update. Depending upon the implementation, existing attributes not specified on the update may be retained or deleted. If there is any chance of updates being received out of the order sent by the agent, a sequence number scheme must be used, in which case an update with a lower sequence number is discarded.

Unless sequence number indicates to discard the update, set attribute change?=yes.

A5—If the resource does not exist, or has not been reported to the resolution layer, discard the deletion. Otherwise, send a delete notification to the resolution layer.

A6—Use a standard algorithm to build a tree of resources considered "reachable" by the agent node, such that the manager can assume the agent would be notified of any status or attribute changes to that resource. Set root node of tree to agent node, which always reports itself in a node update (otherwise redrive FSM with Failure input). For APPN, the root node is marked reachable, as are all of its TGs. For each TG marked operational, supporting CP—CP (control point) sessions and having an even resource sequence number, the partner node of the TG is marked reachable if the partner node has an even resource sequence number. For each new node added to the tree, all of its TGs are marked reachable, and the same check is made for each of its TGs, and so on until the tree is fully built. For each resource added to the tree, an update is created and added to a list of updates to be transferred to the resolution layer.

A7—Put the updated resource on a list of updates to be transferred to the resolution layer. Determine the effect the update has on existing reachability tree. If the resource update has no effect on reachability (for example, a TG does not change operational status, CP—CP session support, or odd/even RSN), nothing more is done. Otherwise, the update may cause more resources to be added to the tree (marked reachable), or to be deleted from the tree (marked unreachable). This can be done in any number of ways, including simply rebuilding the tree. For each resource added to, or deleted from, the tree, create an update for that resource and add it to the list to be transferred to the resolution layer.

A8—Transfer list of updated resource to resolution layer for any resource marked attribute change or reach change?=yes. This is done after the A6 or A7 actions are complete since they may cause a resource to have multiple updates. Reset attribute change and reach change? for each resource.

A9—Each resource in the tree is marked unreachable, and reach change? is set. The tree is deleted. A delete signal is created for each resource in the collection instance's database and sent to the resolution layer.

In FIG. 2, a "-" dash entered in place of an action code indicates there is no action to be taken in response to the input received when in the indicated state. A "-" (dash) entered in place of the new state identification just prior to the parentheses indicates there is no change in state. An "E" entered in place of the new state identification indicates an error condition.

One function of the collection instance FSM is to collect topology information from its associated topology agent application. The collection instance FSM also verifies the reliability of its agents topology information. The collection instance does not compare its agent's information with information from other agents. Rather, it makes its own determination of whether or not this information is reliable by using the same protocol rules that participating nodes in the network would use to validate information.

In an APPN network, for example, the reporting agent node and its own Transmission Groups (TGs) are considered reliable. (A Transmission Group consists of one or more transmission links.) The reporting agent is the root of a connectivity tree. From there, any node that is the partner of a TG that is operative, supports CP—CP (Control Point—Control Point) sessions, and has a valid resource sequence number (RSN), is added to the connectivity tree. In such a case, the added node and all of its TGs are considered reliable information. Similarly, each of the added nodes is checked for partner nodes with TGs meeting the same criteria and not already part of the connectivity tree, until all nodes possible have been added to the connectivity tree. The collection instance is considered to have unreliable information about any node and its TG which are not in its connectivity tree.

Information received by the collection instance FSM is passed up as an update message to the resolution layer along with the RSN of each resource and an indication of whether or not the information is reliable. Indicators are also passed to inform the resolution layer whether this is the first information this collection instance has reported about this resource, and whether or not reliable information indicator has changed from a previous information report by this collection instance. Reliable information indicator is also referred to herein as the reachability change indicator. The reliablity of information about a resource is, of course, directly related to whether the resource is reachable from the collection instance's agent.

The collection instance also informs the resolution layer with a delete message when the collection instances no longer is reporting information about a resource. This would be done, for example, when an individual resource is reported as deleted by the reporting agent, or is assumed to no longer exist by the reporting agent.

Figure 3A:
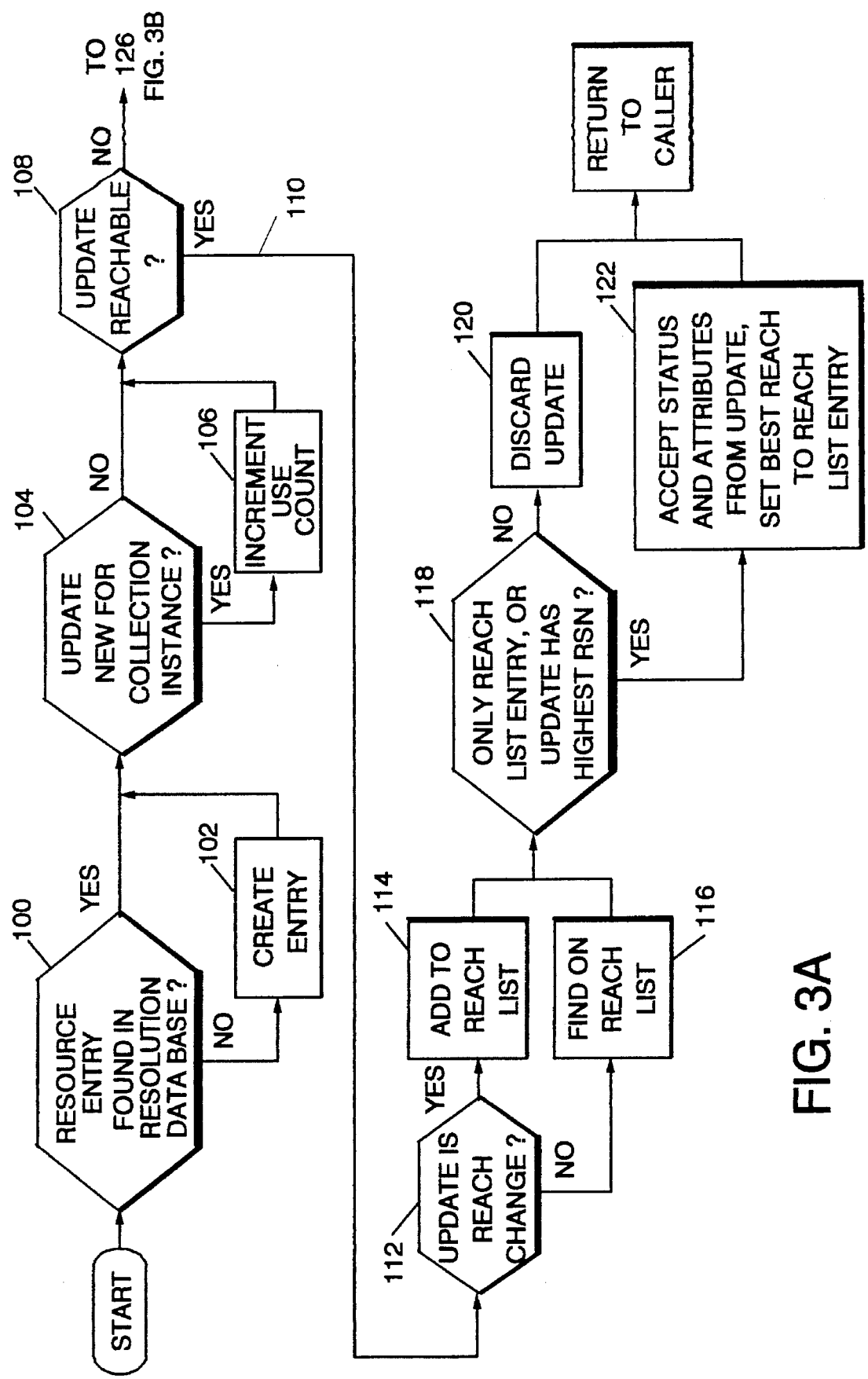

In FIGS. 3A and 3B, the logical operations in the resolution layer for processing an update of topology information begin at decision operation 100 in FIG. 3A. Decision operation 100 tests whether the resolution data base has an entry for the resource (node or transmission group) whose topology information is about to be updated. If it does not have an entry for the node or Transmission Group (TG), the process branches to operation 102 which creates an entry for the node or TG.

After the entry is created or found, decision operation 104 checks to see if the resource (node or TG) information being updated is new for the collection instance that reported the update information to the resolution layer. If the answer is Yes, the process branches to operation 106 which increments a "Use" count for the resource. The resolution layer tracks the number of collection instances reporting on a resource. When there are no collection instances reporting updates on a resource, the resource is subject to deletion.

Whether or not the "Use" count for the resource is incremented, decision operation 108 tests if the collection instance has reported that the resource is reachable. The collection instance will report the resource as reachable if it determines that the agent node has an active path to receive updates about this resource. In effect, the collection instance is reporting that the update information on the resource is reliable. Accordingly, the process branches down path 110 when decision 108 indicates the collection instance has reported the resource as reachable.

The first operation on path 110 is decision 112 which tests whether this is a change in the reachability status for the resource. An agent reports other changes besides a change in reachability status for several reasons. A reachability status change could be caused, for example, by a communication link going down, or coming back up. Other changes could be a change in attribute information, such as routing information through a TG that might have changed. If decision 112 detects that the update is a reachability change, the resource is added at step 114 to the reachable list, or Reach list, kept by the resolution layer. This is a list of resource entries representing collection instances reporting reliable information about that resource. If the change was not a reachability change, the resource must already be on the reachable list. The process then branches to operation 116 which finds the entry for the resource on the reachable list.

After the entry is found, or created in the reachable list, decision operation 118 tests if this is the only entry on the reachable list for the resource or, if not, does the update have the highest RSN (Resource Sequence Number). If the resource has only one entry, it indicates it is reachable only through one node. If the resource has multiple entries, it must be reachable through multiple nodes, and multiple agents may report updates for the resource at different times due to network delays. Accordingly, in the latter event, the RSN must be checked to determine the most recent update information. If the RSN indicates the update is not the most recent update, the process branches to operation 120 which discards the update. If the entry is the only entry for the resource on the reachable list, or if multiple entries, the RSN is the highest for this update, the process branches to operation 122.

In operation 122, the resolution layer accepts the reachability change status and attribute information from the update information reported by the collection instance for the resource. Operation 122 also sets a pointer to point to this entry in the reachable list as having the best topology information for this resource. This is referred to herein as the Best Reach. The Best Reach entry indicates the collection instance and, therefore, the agent node being used by the topology manager for all information about the resource. Accordingly, if something happens to this resource, such as the resource becoming unreachable, the topology manager knows the Best Reach entry has changed, and the manager must take action. After operation 122 or operation 120, the resolution layer returns a message to the caller saying the current update information has been processed, and the collection instance may send the next update information. This completes update processing in the resolution layer if the update was reachable.

If decision operation 108 detects from the collection instance that the resource for the update information is not reachable, the process branches down path 124 to decision operation 126 in FIG. 3B. In effect, the collection information has sent information about a resource (node or TG), but the resource is no longer reachable from the agent reporting the resource in its topology information. Therefore, the collection instance does not consider the information reliable, but reports the information it has about the resource. Decision operation 126 tests whether the "Use" count equals one and the resource update is NEW for the collection instance reporting the update. If the answer is YES, this is the first time resolution layer has learned of this resource. Therefore, the process branches to operation 128 which accepts the change status and attributes from the update information for this resource. Even though the update information is not reliable, the update information is loaded into the entry since it is the only information the resolution layer has about this resource. The resolution layer returns a process complete message to the collection information that sent the update.

If the decision operation 126 detects the "Use" count is not one, or the resource update is not NEW for the collection instance, the process branches to decision operation 130 that tests whether the update information is a reachability change. If it is not, the update information has no value and is discarded at step 132. The process complete message is returned to the caller. If update information does contain a reachability status change, the process branches to operation 134. A reachability change under these conditions indicates the collection instance is reporting that the resource from its viewpoint is no longer reachable. Therefore, operation 134 removes from the reachable list the resource entry associated with this collection instance. Decision operation 136 tests whether this entry was a Best Reach entry. If it was not, the update is complete, and a process complete message is returned to the calling collection instance. If the decision operation 136 detects that the entry was a Best Reach entry, the process branches to operation 138.

Decision operation 138 is checking to determine if the reachable (or reach) list contains other entries for this resource. If the reach list is empty for this resource, the process branches to operation 140. Operation 140 sets the resource status to "unknown," and operation 142 sets the Best Reach to null. In effect, the topology manager will have the last information available for the resource, but marks the information as unreliable. If there are other entries for the resource on the reach list, the process branches to operation 144. In operation 144, the resolution layer finds the reach list entry for the resource with the highest RSN, points to this entry as the Best Reach for the resource, and uses the status and attribute information supplied by that entry's collection instance. The process complete message is then returned to the calling collection instance.

In FIG. 4A, the logical operations by the resolution layer, when processing a delete message from a collection instance, begin at decision operation 150. The delete message says that the calling collection instance will no longer report on this resource. Decision operation 150 checks to see if the reachable list, or reach list, contains an entry for this resource as viewed by this collection instance. If this collection instance had no entry for this resource, the process branches NO down path 151 to operation 152 in FIG. 4B which decrements the "Use" count. Decision operation 154 then tests whether the Use count is zero. If it is not zero, the resolution layer returns a process complete message to the calling collection instance. The resolution layer has just marked one less user of the resource. If the Use count is zero, there are no more users of the resource. The process branches to operation 156 which optionally marks the status of the resource as unknown or as deletable. After operation 156, a process complete message is returned to the calling collection instance.

If the calling collection instance did have an entry on the reach list for this resource, decision operation 150 branches Yes to operation 158. Operation 158 removes this entry from the reach list and passes the process to decision operation 160. Decision operation 160 checks whether the entry just removed was the Best Reach entry. If it was not, the process goes down through path 151 as described above. If the entry just removed was a Best Reach entry, the process branches down path 161 to decision operation 162 which checks to see if this is the last entry for this resource.

Decision operation 162 is checking to determine if the reachable (or reach) list contains other entries for this resource. If the reach list is empty for this resource, the process branches to operation 164. Operation 164 sets the resource status to "unknown," and sets the Best Reach to null. After operation 164, the process drops down to path 151 to decrement the Use count and decide whether to mark the resource deletable. If there are other entries for the resource on the reach list, the process branches to operation 166. In operation 166, the resolution layer finds the reach list entry for the resource with the highest RSN, points to this entry as the Best Reach for the resource, and uses the status and attribute information supplied by that entry's collection instance. The process then goes to path 151 to complete the delete message processing.

To illustrate some of the features of the topology manager and its operation, the processing of topology information in a simple network will now be described. In the network in FIG. 5A, there are three nodes, A, B and C. Two of the nodes, A and C, have a topology agent application. Each pair of nodes is connected to each others node over a TG. Each node has its own view of the TG connecting it with another node. For example, for the TG between nodes A and B, the A's view of the TG from A to B is designated as AB. Likewise, B's view of the same TG is designated as BA.

To begin the illustration, we will assume an operator, or a program using the topology manager, issues a command to monitor the network topology from node A. The manager creates a collection instance for A, and initializes the collection instance to RESET state. The manager then issues the MONCMD to the collection instance FSM. The FSM sends a request for network topology to the agent at node A, and changes to state 2, INITMON. The agent responds by sending its network topology database to the FSM in the form of an update packet for each node A, B, C and for each TG view AB, BA, AC, CA, BC, CB. The UPDATE input from the agent for the first node or TG update packet causes the FSM which is in state INITMON to initialize the collection instance's database, and to load the resource information from the packet into the database. The FSM then goes to state 3, RECVMON. Thereafter, as the UPDATE input is received from the agent for each resource in the network, the FSM stays in state 3, and loads the resource information into the collection instance's database.

Figure 5A:
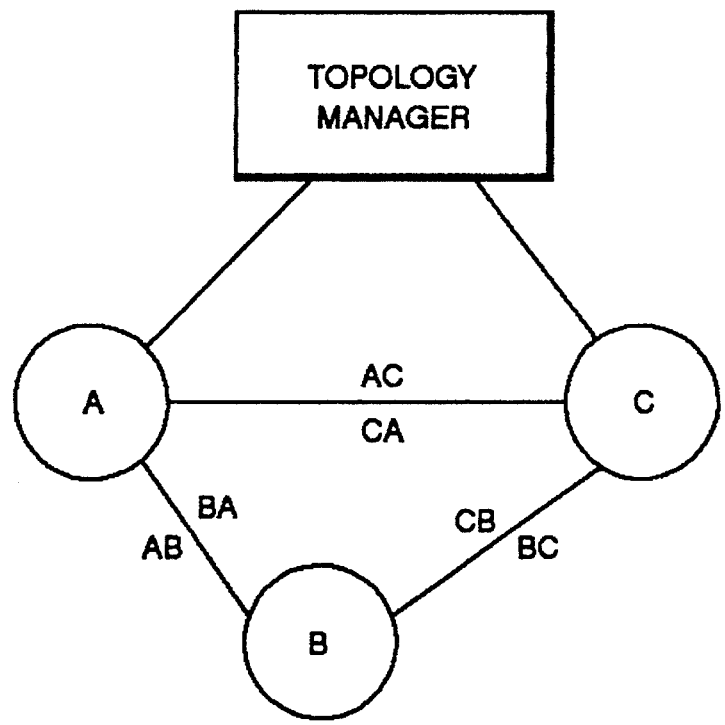
FIGS. 5A–5E show events in the topology of a network as examples to illustrate the operation of the invention.

When the agent at A has finished transferring its topology data base to the collection instance FSM, the agent sends the ITC (Initial Transfer Complete) to the topology manager, which sends an ITC input to the collection instance FSM. The FSM is in state 3 and, in response to ITC, sets the root node of the connectivity tree to A, and builds the tree with all resources reachable from A. In FIG. 5A, all nodes and TGs would be reachable. The FSM then sends an update message to the resolution layer for each resource, node and TG. The update message will report attributes of the resource, whether the resource is reachable, whether the resource is new to this collection instance, and indicate whether there is a reach change; i.e., a change in reachability status since the last update.

The update message for each resource is processed in accordance with the logical operations in FIGS. 3A and 3B. The flow for each update through FIGS. 3A and 3B is as follows: resource entry found? No—create entry—update new? Yes—increment Use count—update reachable? Yes—update reach change? Yes—add to Reach list—only entry or highest RSN? Yes—accept status and attributes for resource from "A" collection instance and set this Reach list entry as the Best Reach—return process complete message to the caller, A collection instance. Now the topology manager has a copy of A's topology data base in the A collection instance, and it has a Reach list for all network resources in the resolution layer.

Now assume the topology manager is asked to get the network topology information for node C. The process through the C collection instance FSM is the same as just described for the A collection instance FSM. The logical operations performed by the resolution layer in processing update messages from the FSM is the same as just described for A with two exceptions. First, decision 100 in FIG. 3A will find an entry for each resource so an entry is not created. Second, decision 118 will branch No because the update message has the same RSN as the entry already loaded for B in the Reach list. This is the case because the resource is fully reachable from A or C so all events at the resource would be known by A or C, and the resource viewed by A or C would have the same RSN. Therefore, the resolution layer discards the update and sends a process complete message back to the caller, C collection instance.

Figure 5B:
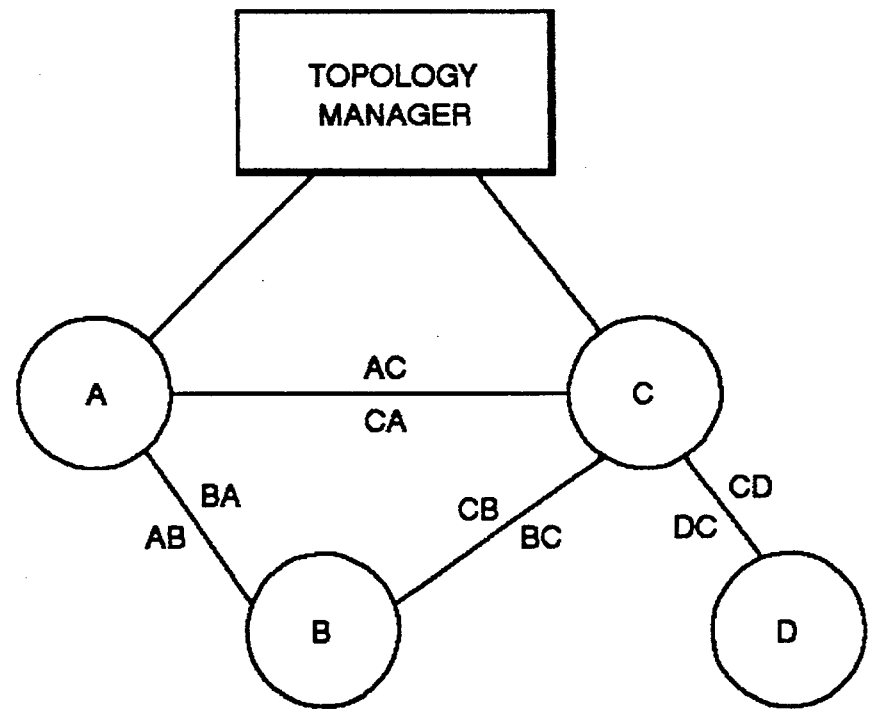

The next event for the network is shown in FIG. 5B where a new node D joins the network by connecting to node C. Node C will report the addition of node D to the network so both A and C will know of the addition of node D. The topology manager could learn of node D from A or C, but for this example, we will assume that it learns of node D first from node C. The C collection instance is in state 4, MON, when the UPDATE input with update packets come in from agent C for node D and TGs, CD and DC. The C FSM creates an entry in the collection instance for each new resource, updates the connectivity tree for reachability as to each new resource, and transfers the updates in update messages to the resolution layer. The update message for each resource will indicate to the resolution layer that the resource is new for this collection instance, reachable by this collection instance and that it is a reach change because it is new.

At the resolution layer, the new resources D, CD and DC will be processed by operations in FIGS. 3A and 3B in the same manner as previously described when node A resource information was being loaded into the Reach list. The resources will be loaded into the Reach list as C collection list entries and will be marked as the Best Reach. At some point, agent A will learn of the addition of D, CD and DC through the network. Therefore, the A collection instance FSM will process the update packets in the same manner as C collection instance FSM described above. The resolution layer, in response to the A FSM, will discard the update information from the A FSM as it will already have the entries with the same RSN for each new resource as just received from the C FSM.

Figure 5C:
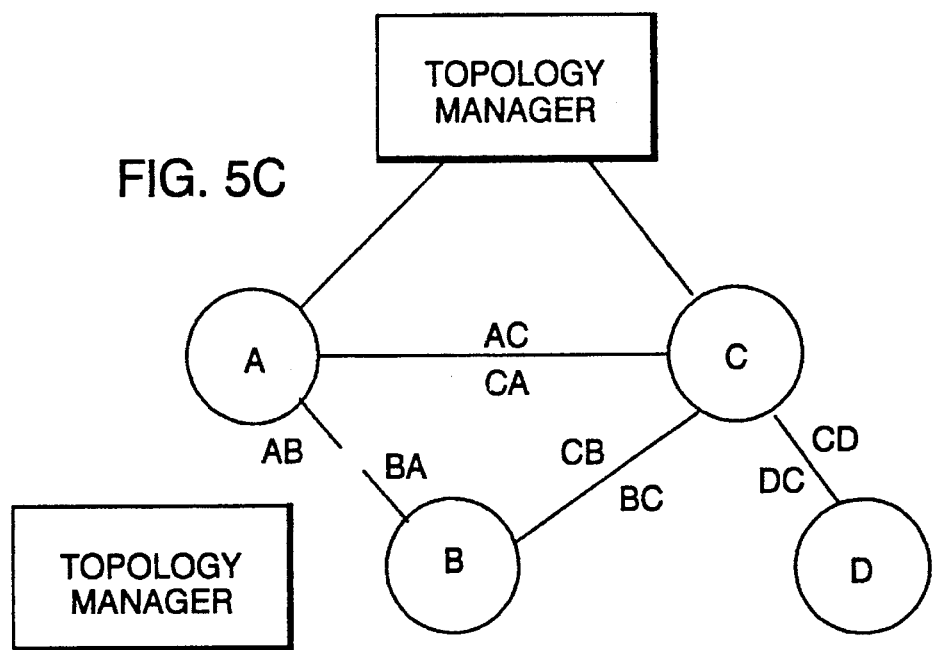

In the next event for the network, as shown in FIG. 5C, the TG between A and B goes down or inoperative. We will assume that agent for node A reports the update for AB and BA to collection instance A before agent C does the same for the C collection instance. The A FSM will indicate in an update message for each of BA and AB that the resource is not new, it is reachable and the update is not a reachability change. At the resolution layer, the logical operations in FIGS. 3A and 3B are as follows: resource entry found? Yes—update new? No—update reachable? Yes—update reach change? No—highest RSN? Yes—set attributes and Best Reach—return to caller.

Agent C will report to C collection instance the same updates as Just reported by agent A to A collection instance. The C collection instance thus reports the updates of AB and BA resources as not new, reachable! and not a reach change. The resolution layer will operate, as described when responding to the A collection instance, except that now the RSN is not highest so the updates will be discarded. The A collection instance entries for AB and BA are therefore still the Best Reach entries.

Figure 5D:
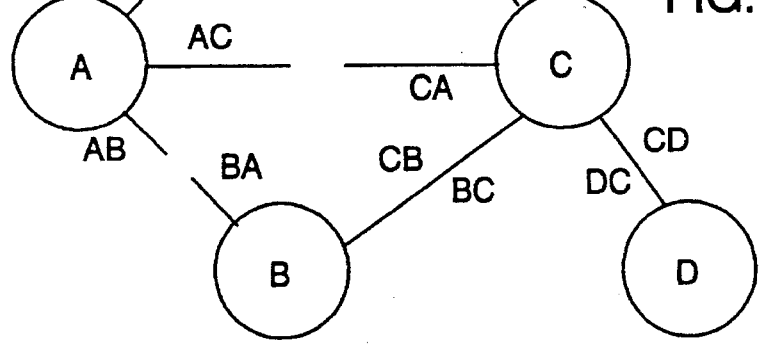

In the network event in FIG. 5D, the TG between A and C now goes down. The network is now fragmented. A is one subnetwork and B, C and D form a second subnetwork. Agent A will report to the A FSM the update for AC; it will not report the update for CA because it has no connectivity path to CA. The A collection instance at the UPDATE input in state 4, MON, sends update message for AC indicating not new, reachable and not a reach change. The A FSM will also update the connectivity tree for node A and, as a result, will build updates for CA, BA, BC, CB, CD, DC, B, C, and D indicating all of these resources as not reachable, not new and reach changed.

In the resolution layer, the update for AC is processed through the logical operations of FIGS. 3A and 3B as follows: resource entry found? Yes—update new? No—update reachable? Yes—update reach change? No—find on reach list—highest RSN? Yes—accept status and attributes and Best Reach still A—return to caller. For resource CA, BA, BC, CB, B and C updates where A was Best Reach, each is processed as follows: resource entry found? Yes—update new? No—update reachable? No—Use count=1 or update new for collection instance? No—update reach change? Yes—remove entry—reach entry is Best Reach? Yes—resource reach list empty? No—find resource reach list entry with highest RSN and get attribute and status from that collection instance ("C")—return to caller. For resource CD, DC and D updates which have a Best Reach set for C collection instance, each update is processed as follows: resource entry found? Yes—update new? No—update reachable? No—Use count =1 or update new collection instance? No—update reach change? Yes—remove from reach list—reach entry is Best Reach? No—return to caller.

At the C collection instance, the C agent will report an update CA and nothing for AC. The C collection instance FSM creates update message for CA as reachable, not new and no reach change. The C collection instance FSM creates an update message for each of A, AC and AB as not reachable, not new and reach changed.

In the resolution layer, the update for CA is processed in the same manner as the update for resource AC from the A collection agent was processed. The updates for A, AC and AB will be processed in the same manner as the updates from collection instance A where the updated resource had the Best Reach from C. In other words, the entry for A, AC and AB as viewed from C collection instance will be removed, but these entries are not Best Reach entries so no other action is required.

Figure 5E:
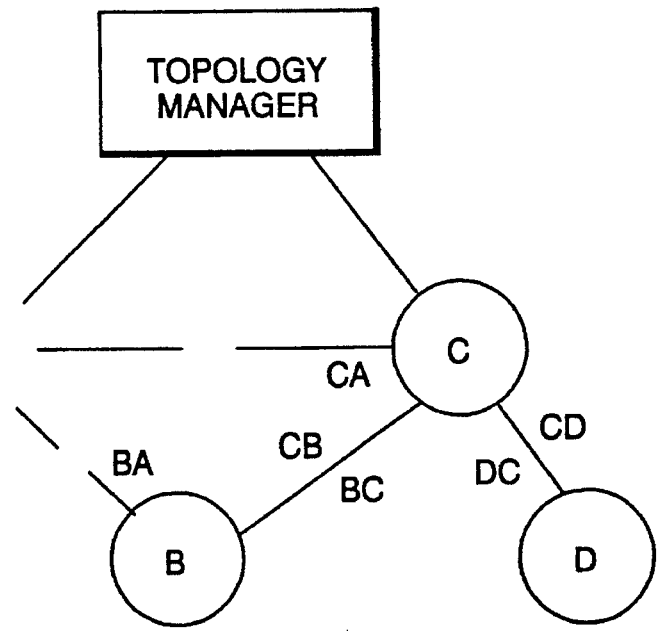

In the next event for the network, node A goes down and as depicted in FIG. 5E effectively disappears from the network. Node C has no awareness of node A going down since there is no connectivity between A and C in the network. The topology manager detects the loss of association in the CMIP session with node A, and sends a FAILURE input to the A collection instance FSM. The A FSM is in MON state so the FAILURE input results in execution of action A9. In action A9, the A FSM deletes its connectivity tree, and sends a delete message to the resolution layer for all resources A has previously reported whether or not reported as reachable. After all the delete messages are sent, the A collection instance may be deleted.

In the resolution layer, the delete message from collection instance A for resources A, AB and AC reachable from node A is processed in FIGS. 4A and 4B as follows: entry match on Reach list? Yes—remove from reach list—reach entry is Best Reach? Yes—for this resource is reach list empty? Yes—set resource status to "unknown" and Best Reach to Null—decrement Use count—Use count =0?No—return to caller. For the remaining resources which were not reachable from node A, the delete message from collection instance A is processed in FIGS. 4A and 4B as follows: entry match on Reach list? No—decrement Use count—Use count=0' No—return to caller. As a result, resources A, AB and AC are no longer reachable, their status is marked unknown, and they are no longer on the REACH list. The remaining resources are reachable from C, and remain on the reach list.

In the final event, for examples of operation of the topology manager, node A is powered on, but is not connected to nodes B and C. Accordingly, the network is the same as illustrated in FIG. 5D; however, in this case, it is assumed node A has lost all memory of the topology of the early network FIG. 5B. Since node A cannot exchange topology information with nodes B and C, it has no way to relearn the topology of the original larger network in FIG. 5B.

When node A comes back up, it restarts its RSN at 0. When A updates its topology information the first time, it finds it is in a one node network. With this update event the RSN for node A goes to 2 (only even numbers are used for RSNs). The RSN remembered for node A by node C will be higher. We will assume the RSN for node A in the topology information at node C is 8. This situation indicates the need for the reachability test in that A has the more current information, but C has a higher RSN for A. Thus, C's information would be used for A, but for the fact the resource A will be marked unreachable from C.

When the topology manager requests topology information from A after A comes back up, the process described for the first event (FIG. 5A) is repeated. However, this time the only network reported to the A collection instance FSM is a single node, A, network. Similarly, the A collection FSM only updates the resolution layer with A as a single node network. The update process for A in FIGS. 3A and 3B is as follows: resource entry found? No—create entry—update new? Yes—increment Use count—update reachable? Yes— update reach change? Yes—add to Reach list—only Reach list entry for A? Yes—accept status and attributes from A collection instance and set Best Reach—return to caller. Now the resolution has added resource A back into the Reach list and marked it as the Best Reach. Note that there is no resource Reach list entry for AB or AC, and their status is still "unknown" with a Best Reach set to Null.

While a number of preferred embodiments of the invention have been shown and described, it will be appreciated by one skilled in the art, that a number of further variations or modifications may be made without departing from the spirit and scope of our invention.

What is claimed is:

1. In a communication network having a plurality of network resources as nodes or transmission groups between nodes, topology manager apparatus that has an agent in at least some of the nodes, said topology manager apparatus comprising:

a plurality of collecting means, each collecting means for collecting topology information from an associated agent, said topology information indicating the topology of the network as viewed by the associated agent;

each of said plurality of collecting means providing resource information about each network resource as viewed by the associated agent, said resource information indicating the reliability, time and sequence of the resource information;

means within each of said plurality of collecting means for analyzing the connectivity of each network resource from the topology information that is provided by the associated agent, for providing status information about each network resource that is included in the topology information that is provided by the associated agent, and for providing reachability information indicating whether a network resource is reachable from the associated agent through the connectivity of the network; and resolution means responsive to the resource information from each of said plurality of collecting means for resolving conflicts in resource information from said plurality of collecting means based on said reliability, time and sequence of the resource information from each of said plurality of collecting means;

said resolution means being responsive to the status information about each network resource and operating to create an entry in a resolution database for each new network resource that is identified by said plurality of collecting means;

said resolution means being responsive to the reachability information for updating a reach list that indicates the reachability from a collecting means to network resources.

2. In a communication network having a plurality of resources as nodes or transmission groups between nodes, topology manager apparatus having agents in at least some of the nodes, said apparatus comprising:

a plurality of collecting means, each collecting means for collecting topology information from an associated agent, said topology information indicating the topology of the network as viewed by the associated agent's node;

each of said collecting means providing resource information about each resource in the network as viewed by the associated agent node of said collecting means, said resource information indicating the reliability of the resource information;

said collecting means having an analyzing means and a status means;

resolution means responsive to the resource information from each of said collecting means for resolving conflicts in resource information from separate collecting means based on the reliability of the resource information;

said resolution means having a creating means and an updating means:

said analyzing means for analyzing the connectivity of the resources in the network from the topology information provided by the associated agent node;

said status means responsive to said analyzing means for providing status information about each resource included in the topology information from the associated agent node and for providing reachability information indicating whether the resource is reachable from the associated agent node through the connectivity of the network;

said creating means responsive to the status information about each resource for creating an entry in a resolution database for each new resource identified by said collecting means;

said updating means responsive to the reachability information for updating a reach list, the reach list indicating the reachability from said collecting means of resources analyzed by said analyzing means in said collecting means;

means for adding an entry for each resource to the reach list if the resource is reachable from said collecting means and the resource as reached via that collecting means is not on the reach list; and means for identifying a best reach entry on the reach list for that resource from multiple entries for the resource from said plurality of collecting means, the best reach entry being the reach entry with the most recent update by the reachability information.

3. The apparatus of claim 4 wherein a collecting means sends a delete message indicating the collecting means will no longer report on said resource and wherein said updating means further comprises:

means in response to the delete message for removing from said reach list a reach entry for the resource as viewed from the deleting collecting means;

means for testing and indicating whether the reach entry being removed is a best reach entry; and means for identifying a next best reach entry on the reach list for that resource from multiple entries for the resource from said plurality of collecting means.

4. In a communication network having a plurality of network resources as nodes or transmission groups between, a method for managing the topology of the network using agents in at least some of the nodes to monitor the topology of the network, said method comprising the steps of:

collecting network topology information from each agent by identifying each network resource and the connectivity of each resource in the network as viewed from the agent's node;

analyzing the connectivity of each network resource in the network from the topology information provided by each agent and providing reachability status, the reachability status indicating whether the resource is reachable from the agent's node through the connectivity of the network;

based on the resource reachability status resolving conflicts in reachability about the same network resource as viewed from different agents;

said resolving step comprises the steps of:
  creating an entry in a resolution database for each new resource identified by said collecting step;
  adding an entry in a reach list for each new resource; and
  updating the reach list based on the reachability status, the reach list indicating the reachability of each network resource as viewed by each agent node; and said updating step identifying a best reach entry on the reach list for each network resource reachable from the agent nodes, the best reach entry being the entry on the reach list with the most reliable information.

5. The method of claim 4 wherein a network resource is active but no longer reachable by an agent node's transmission groups, said method further comprising the steps of:

appending to a tagged stored resource record in said agent node a delete message if said resource is no longer reachable by said agent node;

analyzing and resolving, at said topology manager, said delete message appended to a tagged stored resource record by deleting from said reach list a reach entry indicating the reachability of said active network resource by said transmission groups;

testing and indicating whether the reach entry being removed from said reach list is a best reach entry; and identifying a new best reach entry on the reach list for the network resource from multiple entries for the same network resource through other agent nodes.

6. The method of claim 5 wherein said updating step further comprises the steps of:

testing whether or not said reach list entry being removed by said removing step is the only reach list entry for that network resource;

if the entry being removed from said reach list is the only entry for that network resource, marking that network resource with unknown status and setting the best reach entry to null.

7. The method of claim 5 and in addition the steps of:

testing whether or not the network resource, whose entry is being removed from said reach list, is in use by any other agent node;

if the network resource, whose entry is being removed from the reach list, is not in use by any other agent node, deleting the entry for that network resource from said reach list.

* * * * *